United States Patent
Cooper et al.

(10) Patent No.: US 8,532,850 B2
(45) Date of Patent: *Sep. 10, 2013

(54) SYSTEM AND METHOD FOR COMMUNICATING DATA IN LOCOMOTIVE CONSIST OR OTHER VEHICLE CONSIST

(75) Inventors: Jared Klineman Cooper, Palm Bay, FL (US); Todd William Goodermuth, Satellite Beach, FL (US); Eugene A. Smith, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 593 days.

This patent is subject to a terminal disclaimer.

(21) Appl. No.: 12/683,874

(22) Filed: Jan. 7, 2010

(65) Prior Publication Data

US 2010/0241295 A1    Sep. 23, 2010

Related U.S. Application Data

(60) Provisional application No. 61/160,930, filed on Mar. 17, 2009.

(51) Int. Cl.
G06F 17/00    (2006.01)

(52) U.S. Cl.
USPC ............................................ 701/19; 375/258

(58) Field of Classification Search
USPC ....... 701/19; 104/307; 105/26.05; 375/220, 375/258; 246/167 R
See application file for complete search history.

(56) References Cited

U.S. PATENT DOCUMENTS

| 1,517,549 A | 12/1924 | Espenschied |
| 3,675,196 A | 7/1972 | Molloy |
| 3,694,751 A | 9/1972 | Takahashi |
| 3,714,419 A | 1/1973 | Fosse |
| 3,715,669 A | 2/1973 | LaForest |
| 3,745,933 A | 7/1973 | Eisele et al. |
| 3,750,020 A | 7/1973 | Baba |
| 3,754,209 A | 8/1973 | Molloy |

(Continued)

FOREIGN PATENT DOCUMENTS

| DE | 102005057273 A1 | 5/2007 |
| EP | 0829415 A1 | 3/1998 |

(Continued)

OTHER PUBLICATIONS

Search Report and Written Opinion for corresponding PCT Application No. PCT/US2010/053471, dated Jan. 21, 2011, pp. 1-9.

(Continued)

*Primary Examiner* — Russell Frejd
(74) *Attorney, Agent, or Firm* — GE Global Operation; John A. Kramer (57) ABSTRACT

A locomotive consist includes a lead locomotive, one or more trail locomotives, and a multiple unit (MU) cable bus interconnecting the first locomotive and the trail locomotives, which is used in the locomotive consist for transferring non-network control information between the lead vehicle and the trail locomotives. In a system and method for communicating data in the locomotive consist, network data is transmitted from the lead locomotive in the locomotive consist to one or more of the trail locomotives in the locomotive consist. The network data is transmitted over the MU cable bus. Each locomotive may include a computer unit or other electronic component, which along with the MU cable bus form a network in the train, e.g., an Ethernet network.

15 Claims, 6 Drawing Sheets

(56) References Cited

U.S. PATENT DOCUMENTS

| | | |
|---|---|---|
| 3,815,085 A | 6/1974 | Leclercq |
| 3,835,950 A | 9/1974 | Asano |
| 3,891,965 A | 6/1975 | Schroeder |
| 3,938,129 A | 2/1976 | Smither |
| 3,949,959 A | 4/1976 | Rhoton |
| 4,074,879 A | 2/1978 | Clark |
| 4,207,569 A | 6/1980 | Meyer |
| 4,344,364 A | 8/1982 | Nickles et al. |
| 4,369,942 A | 1/1983 | Wilson |
| 4,420,133 A | 12/1983 | Dietrich |
| 4,442,988 A | 4/1984 | Laurent |
| 4,491,967 A | 1/1985 | Kobayashi |
| 4,498,650 A | 2/1985 | Smith |
| 4,645,148 A | 2/1987 | Kolkman |
| 4,655,421 A | 4/1987 | Jaeger |
| 4,735,385 A | 4/1988 | Nickles et al. |
| 4,910,793 A | 3/1990 | Mainardi |
| 5,019,815 A | 5/1991 | Lemelson |
| 5,056,873 A | 10/1991 | Deno |
| 5,132,682 A | 7/1992 | Higgins |
| 5,208,584 A | 5/1993 | Kaye |
| 5,248,967 A | 9/1993 | Daneshfar |
| 5,289,378 A | 2/1994 | Miller et al. |
| 5,293,632 A | 3/1994 | Novakovich et al. |
| 5,309,155 A | 5/1994 | Hsien |
| 5,317,751 A | 5/1994 | Novakovich et al. |
| 5,330,134 A | 7/1994 | Ehrlich |
| 5,339,782 A | 8/1994 | Golzer |
| 5,342,120 A | 8/1994 | Zimmer |
| 5,353,413 A | 10/1994 | Novakovich et al. |
| 5,491,463 A | 2/1996 | Sargeant |
| 5,507,456 A | 4/1996 | Brown |
| 5,530,328 A | 6/1996 | Fernandez et al. |
| 5,548,815 A | 8/1996 | Takayama |
| 5,581,472 A | 12/1996 | Miller et al. |
| 5,630,565 A | 5/1997 | Lumbis |
| 5,633,629 A | 5/1997 | Hochstein |
| 5,636,907 A | 6/1997 | Okazaki |
| 5,681,015 A * | 10/1997 | Kull ........................... 246/187 C |
| 5,749,547 A | 5/1998 | Young |
| 5,787,371 A | 7/1998 | Balukin et al. |
| 5,859,584 A | 1/1999 | Counsell |
| 5,867,404 A | 2/1999 | Bryan |
| 5,870,016 A | 2/1999 | Shrestha |
| 5,901,683 A | 5/1999 | Patel |
| 5,928,294 A | 7/1999 | Zelinkovsky |
| 5,950,966 A | 9/1999 | Hungate |
| 6,032,905 A | 3/2000 | Haynie |
| 6,102,340 A | 8/2000 | Peek |
| 6,163,089 A * | 12/2000 | Kull ............................. 307/151 |
| 6,203,343 B1 | 3/2001 | Chevassus-More et al. |
| 6,216,985 B1 | 4/2001 | Stephens |
| 6,217,126 B1 | 4/2001 | Kull |
| 6,225,919 B1 | 5/2001 | Lumbis et al. |
| 6,229,452 B1 | 5/2001 | Kull |
| 6,283,765 B1 | 9/2001 | Lumbis et al. |
| 6,313,589 B1 | 11/2001 | Kobayashi |
| 6,317,031 B1 | 11/2001 | Rickard |
| 6,330,499 B1 | 12/2001 | Chou et al. |
| 6,384,735 B1 | 5/2002 | Rabou |
| 6,400,281 B1 | 6/2002 | Darby, Jr. |
| 6,401,015 B1 | 6/2002 | Stewart |
| 6,435,624 B1 * | 8/2002 | Kull et al. ........................ 303/15 |
| 6,445,150 B1 | 9/2002 | Tanner |
| 6,452,482 B1 | 9/2002 | Cern |
| 6,456,908 B1 | 9/2002 | Kumar |
| 6,463,367 B2 | 10/2002 | Neff |
| 6,487,478 B1 | 11/2002 | Azzaro |
| 6,504,485 B2 | 1/2003 | Jinno |
| 6,582,031 B2 | 6/2003 | Newton et al. |
| 6,688,561 B2 | 2/2004 | Mollet |
| 6,759,871 B2 | 7/2004 | Nguyen et al. |
| 6,830,224 B2 | 12/2004 | Lewin |
| 6,839,664 B1 * | 1/2005 | Kull ................. 703/23 |
| 6,856,865 B2 | 2/2005 | Hawthorne |
| 6,862,502 B2 | 3/2005 | Peltz |
| 6,885,854 B2 | 4/2005 | Stewart |
| 6,977,578 B2 | 12/2005 | Kline |
| 6,980,127 B2 | 12/2005 | Lumbis et al. |
| 7,004,550 B2 | 2/2006 | Root et al. |
| 7,006,012 B2 | 2/2006 | Taoka |
| 7,021,588 B2 | 4/2006 | Hess et al. |
| 7,029,076 B2 | 4/2006 | Root et al. |
| 7,038,597 B2 | 5/2006 | Smith |
| 7,042,351 B2 | 5/2006 | Kline |
| 7,069,123 B2 | 6/2006 | Lapointe |
| 7,072,408 B2 | 7/2006 | Gehlot |
| 7,072,747 B2 | 7/2006 | Armbruster |
| 7,075,414 B2 | 7/2006 | Giannini |
| 7,076,343 B2 | 7/2006 | Kornick |
| 7,079,926 B2 | 7/2006 | Kane |
| 7,140,577 B2 | 11/2006 | Mollet |
| 7,143,017 B2 | 11/2006 | Flynn |
| 7,162,337 B2 | 1/2007 | Peltz |
| 7,164,368 B1 | 1/2007 | Ireland |
| 7,222,003 B2 | 5/2007 | Stull |
| 7,236,765 B2 | 6/2007 | Bonicatto |
| 7,257,471 B2 | 8/2007 | Kornick |
| 7,264,208 B2 | 9/2007 | Kovach |
| 7,302,895 B2 | 12/2007 | Kumar |
| 7,333,027 B2 | 2/2008 | Bourgault |
| 7,336,156 B2 | 2/2008 | Arita |
| 7,356,389 B2 | 4/2008 | Holst |
| 7,467,032 B2 | 12/2008 | Kane |
| 7,494,194 B2 | 2/2009 | Higgs et al. |
| 7,532,604 B2 | 5/2009 | Eglin |
| 7,618,011 B2 * | 11/2009 | Oleski et al. ............... 246/167 R |
| 7,653,465 B1 | 1/2010 | Geiger |
| 7,664,459 B2 | 2/2010 | Smith, Jr. |
| 7,667,344 B2 | 2/2010 | Zitting |
| 7,673,568 B2 * | 3/2010 | Marra et al. ................ 105/26.05 |
| 7,688,218 B2 | 3/2010 | Lefebvre |
| 7,948,398 B2 | 5/2011 | Miller |
| 7,994,937 B2 | 8/2011 | Hsu |
| 2001/0044681 A1 | 11/2001 | Diana et al. |
| 2001/0044695 A1 | 11/2001 | Doner |
| 2002/0087578 A1 | 7/2002 | Vroman |
| 2002/0186670 A1 | 12/2002 | Fuster Rufilanchas et al. |
| 2003/0009274 A1 | 1/2003 | Peterson et al. |
| 2003/0021441 A1 | 1/2003 | Levy |
| 2003/0034423 A1 | 2/2003 | Hess et al. |
| 2003/0087543 A1 | 5/2003 | Hess et al. |
| 2003/0094545 A1 | 5/2003 | Smith |
| 2003/0137191 A1 | 7/2003 | Smith |
| 2003/0151520 A1 | 8/2003 | Kraeling et al. |
| 2003/0210671 A1 | 11/2003 | Eglin |
| 2003/0213875 A1 | 11/2003 | Hess et al. |
| 2003/0223387 A1 | 12/2003 | Davenport |
| 2004/0084957 A1 | 5/2004 | Root et al. |
| 2004/0104312 A1 | 6/2004 | Hess et al. |
| 2005/0076716 A1 | 4/2005 | Turner |
| 2005/0125113 A1 | 6/2005 | Wheeler |
| 2005/0143868 A1 | 6/2005 | Whelan |
| 2005/0143874 A1 | 6/2005 | Peltz |
| 2005/0160169 A1 | 7/2005 | Segal |
| 2005/0189815 A1 | 9/2005 | Bryant |
| 2005/0197748 A1 | 9/2005 | Holst |
| 2005/0228552 A1 | 10/2005 | Kornick |
| 2005/0254818 A1 | 11/2005 | Zhou et al. |
| 2006/0025903 A1 * | 2/2006 | Kumar ............................. 701/19 |
| 2006/0085103 A1 | 4/2006 | Smith et al. |
| 2006/0138285 A1 | 6/2006 | Oleski et al. |
| 2006/0170285 A1 | 8/2006 | Morimitsu |
| 2006/0180709 A1 | 8/2006 | Breton et al. |
| 2007/0061056 A1 | 3/2007 | Valsorda |
| 2007/0173989 A1 | 7/2007 | Walker |
| 2007/0228813 A1 | 10/2007 | Smith |
| 2007/0236079 A1 | 10/2007 | Kull |
| 2007/0241610 A1 | 10/2007 | Smith |
| 2008/0033605 A1 | 2/2008 | Daum |
| 2008/0087772 A1 | 4/2008 | Smith |
| 2008/0112473 A1 | 5/2008 | Refaeli et al. |
| 2008/0159281 A1 | 7/2008 | Jesseph |
| 2008/0173770 A1 | 7/2008 | Ruggiero |

| | | | |
|---|---|---|---|
| 2008/0195265 A1 | 8/2008 | Searle | |
| 2009/0079560 A1 | 3/2009 | Fries | |
| 2009/0158360 A1 | 6/2009 | Diab et al. | |
| 2009/0223760 A1 | 9/2009 | Smith | |
| 2010/0034298 A1 | 2/2010 | Takahashi et al. | |
| 2010/0049384 A1 | 2/2010 | Kraeling | |
| 2010/0049830 A1 | 2/2010 | Chenu | |
| 2010/0118988 A1 | 5/2010 | Smith | |
| 2010/0130124 A1 | 5/2010 | Teeter | |
| 2010/0171609 A1 | 7/2010 | Yeldell | |
| 2010/0185472 A1 | 7/2010 | Goodermuth | |
| 2010/0241295 A1 | 9/2010 | Cooper | |
| 2010/0332058 A1 | 12/2010 | Kane | |
| 2011/0099413 A1* | 4/2011 | Cooper et al. | 714/4.1 |
| 2011/0270475 A1* | 11/2011 | Brand et al. | 701/20 |
| 2011/0284700 A1 | 11/2011 | Brand | |
| 2012/0074266 A1 | 3/2012 | Daum | |
| 2012/0078452 A1 | 3/2012 | Daum | |
| 2012/0078453 A1 | 3/2012 | Daum | |

FOREIGN PATENT DOCUMENTS

| | | |
|---|---|---|
| EP | 1065128 A1 | 1/2001 |
| EP | 1601136 A1 | 11/2005 |
| EP | 1693272 A1 | 8/2006 |
| EP | 1719688 A1 | 11/2006 |
| EP | 1886893 A1 | 2/2008 |
| EP | 1897781 A2 | 3/2008 |
| KR | 20110039071 A | 4/2011 |
| WO | 9842096 A2 | 9/1998 |
| WO | 0171942 A2 | 9/2001 |
| WO | 0222425 A1 | 3/2002 |
| WO | 0223503 A1 | 3/2002 |
| WO | 03098861 A1 | 11/2003 |
| WO | 2005102018 A2 | 11/2005 |
| WO | 2006075767 A2 | 7/2006 |
| WO | 2006134434 A1 | 12/2006 |
| WO | 2007095401 A2 | 8/2007 |
| WO | 2007121043 A1 | 10/2007 |
| WO | 2010059312 A1 | 5/2010 |
| WO | 2011042943 A1 | 4/2011 |

OTHER PUBLICATIONS

Search Report and Written Opinion from corresponding PCT Application No. PCT/US2011/055013, dated Apr. 10, 2012, pp. 1-16.
Hoerl, F. et al. "Multiple Radio Remote Control of Locomotives in Coupled Trains/Telecommande Multiple Par Radio D'Engins Dans Le Train", vol. 100, No. 3, pp. 105-109, Mar. 1, 2002.
Search Report and Written Opinion from corresponding PCT Application No. PCT/US2012/042675, dated Aug. 10, 2012, pp. 1-14.
Search Report and Written Opinion from corresponding PCT Application No. PCT/US2012/041858, dated Nov. 30, 2012, pp. 1-14.
Search Report and Written Opinion from corresponding PCT Application No. PCT/US2011/36159, dated Aug. 30, 2011, pp. 1-7.
Search Report and Written Opinion from corresponding PCT Application No. PCT/US2011/42476, dated Aug. 31, 2011, pp. 1-8.
Search Report and Written Opinion for corresponding PCT Application No. PCT/US2011/051536, dated Jan. 24, 2012.

* cited by examiner

SYSTEM AND METHOD FOR COMMUNICATING DATA IN LOCOMOTIVE CONSIST OR OTHER VEHICLE CONSIST

This application claims priority to U.S. Provisional Application Ser. No. 61/160,930 filed Mar. 17, 2009.

FIELD OF THE INVENTION

Embodiments of the invention relate to data communications and, more particularly, to data communications in a locomotive consist or other vehicle consist.

BACKGROUND OF THE INVENTION

A locomotive "consist" is a group of two or more locomotives that are mechanically coupled or linked together to travel along a route. Trains may have one or more locomotive consists. Locomotives in a consist include a lead locomotive and one or more trail locomotives. A train will have at least one lead consist, and may also have one or more remote consists positioned further back in the train.

In a locomotive consist, each locomotive includes a connection at each end of the locomotive to couple the power and brake systems of the locomotive to adjacent locomotives such that they function together as a single unit. Each locomotive to connected to subsequent locomotives via a port and jumper cable that includes twenty seven pins on each end. This cable is commonly referred to in the industry as a multiple unit cable or "MU" cable. Two or more of the locomotives in a consist may each include an on-board controller or other electronics. In certain cases, it may be desirable to link the on-board electronics together as a computer network, such that electronics of the lead locomotive in the consist can communicate with electronics of the trail locomotives. This intra-consist network may allow for inherent redundancies in locomotive electronics to be used to improve reliability of locomotives by allowing lead locomotives to utilize electronic equipment contained in trail locomotives of the same consist. It may be easier and more cost effective to use remote electronics in a trail locomotive than providing redundant equipment on each locomotive.

Heretofore, communications in a locomotive consist have been realized using two methods. The first involves wireless communications between the vehicles in the consist using radio equipment. Wireless communications, however, are costly to implement, and are particularly prone to cross talk between connected locomotives and locomotives not physically connected on adjacent tracks. The second method involves running dedicated network cables between the linked locomotives in a consist. However, in most cases this requires retrofitting existing vehicles with additional cables, which is oftentimes cost prohibitive. Additionally, since the cabling is exposed in the separation space between adjacent linked locomotives, the cabling may be prone to failure if the vehicle consist is operated in harsh environmental conditions, e.g., bad weather. Finally, there is additional labor required to connect locomotives with dedicated network cables, and this will require additional training.

BRIEF DESCRIPTION OF THE INVENTION

Embodiments of the present invention relate to a system and method for communicating data in a locomotive consist. "Locomotive consist" refers to a group of locomotives that are mechanically coupled or linked together to travel along a set of one or more rails. In one embodiment of the method, network data is transmitted between a lead locomotive in the locomotive consist and one or more trail locomotives in the locomotive consist. "Network data" refers to data that is packaged in packet form as data packets. Each data packet includes the network address of a recipient computer unit or other electronic component. The network data is transmitted over an existing locomotive multiple unit (MU) cable bus that interconnects the lead locomotive and the trail locomotives. The MU cable bus is an existing electrical bus that is used in the locomotive consist for transferring non-network control information between the lead locomotive and the trail locomotives. (MU "cable bus" refers to the MU cable jumper that actually interconnects adjacent locomotives and/or to the internal electrical system that connects the cable jumper to internal locomotive electronics and the MU ports on either end of a locomotive.) "Non-network" control information refers to command information, used in the locomotive consist for locomotive control purposes, which is not packet data. In another embodiment, non-network control information is not packet data, and does not include recipient network addresses.

In another embodiment, the network data is converted at one of the locomotives into modulated network data for transmission over the MU cable bus. The modulated network data is orthogonal to the non-network control information transferred between the lead and trail locomotives over the MU cable bus. "Orthogonal" means that the modulated network data does not interfere with the non-network control information, and that the non-network control information does not interfere with the modulated network data. At another locomotive in the consist (e.g., a recipient locomotive), the modulated network data is received over the MU cable bus and de-modulated for use by a computer unit or other electronic component in the locomotive.

Another embodiment relates to a communication system for communicating data in a locomotive consist. The system comprises respective router transceiver units positioned in the lead locomotive and each of the trail locomotives in the locomotive consist. The router transceiver units are each electrically coupled to an MU cable bus in the locomotive consist that interconnects the lead locomotive and the trail locomotives. The MU cable bus is an existing cable bus that is used in the locomotive consist for transferring non-network control information between the lead and trail locomotives. The router transceiver units are configured to transmit and/or receive network data over the MU cable bus.

In another embodiment of the communication system, each router transceiver unit is configured to convert the network data into modulated network data for transmission over the MU cable bus, and to de-modulate modulated network data received over the MU cable bus back into network data, for use in communicating data between electronic components in the locomotive consist or otherwise. The modulated network data is orthogonal to the non-network control information transferred between the lead and trail locomotives over the MU cable bus.

In any of the aforementioned embodiments, the network data may be TCP/IP-formatted data; other communications protocols may be used. Additionally, each locomotive may include computer units or other electronic components communicating with other electronic components in the same consist by transmitting the network data, formatted as TCP/IP data or otherwise, over the MU cable bus, thereby forming a computer network, e.g., an Ethernet-type network.

Any of the aforementioned embodiments are also applicable for communicating data in vehicle consists generally.

"Vehicle consist" refers to a group of vehicles that are mechanically coupled or linked together to travel along a route.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
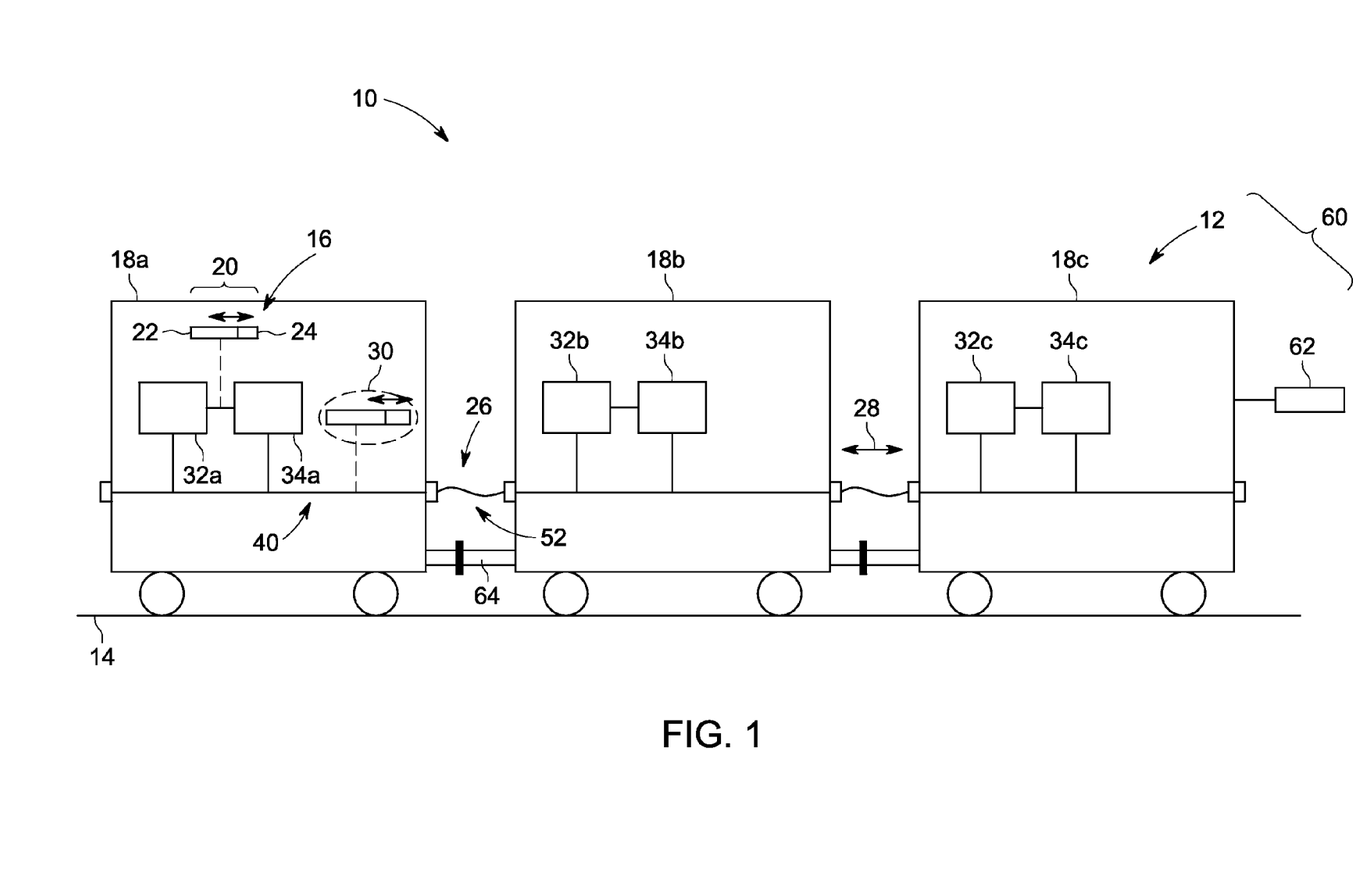
FIG. 1 is a schematic diagram of a communication system for communicating data in a locomotive consist, according to an embodiment of the present invention.

With reference to FIG. 1, embodiments of the present invention relate to a communication system 10 and method for communicating data in a locomotive consist 12. "Locomotive consist" refers to a group of locomotives that are mechanically coupled or linked together to travel along a railway 14. In the system 10, network data 16 is transmitted from one locomotive 18a in the consist 12 (e.g., a lead locomotive 18a) to another locomotive 18b in the consist (e.g., a trail locomotive 18b). Each locomotive 18a-18c is adjacent to and mechanically coupled with another locomotive in the consist 12 such that all locomotives in the consist are connected. "Network data" 16 refers to data that is packaged in packet form, meaning a data packet that comprises a set of associated data bits 20. (Each data packet may include a data field 22 and a network address or other address 24 uniquely associated with a computer unit or other electronic component in the consist 12.) The network data 16 is transmitted over a locomotive multiple unit (MU) cable bus 26. The MU cable bus 26 is an existing electrical bus interconnecting the lead locomotive 18a and the trail locomotives 18b, 18c in the consist. The MU cable bus 26 is used in the locomotive consist 12 for transferring non-network control information 28 between locomotives in the consist. "Non-network" control information 28 refers to data or other information, used in the locomotive consist for control purposes, which is not packet data. In another aspect, non-network control information 28 is not packet data, and does not include recipient network addresses.

In another embodiment, as discussed in more detail below, the network data 16 is converted into modulated network data 30 for transmission over the MU cable bus 26. The modulated network data 30 is orthogonal to the non-network control information 28 transferred between locomotives over the MU cable bus 26, to avoid interference. At recipient/subsequent locomotives, the modulated network data 30 is received over the MU cable bus 26 and de-modulated for use by a locomotive electronic component 32a, 32b, 32c. For these functions, the communication system 10 may comprise respective router transceiver units 34a, 34b, 34c positioned in the lead locomotive 18a and each of the trail locomotives 18b, 18c in the locomotive consist 12.

By using an existing inter-vehicle cable bus for transmitting network data between locomotives, the system and method of the present invention avoids interference and other problems associated with wireless transmissions, and obviates the need to specially outfit the locomotives with dedicated network cables.

Figure 2:
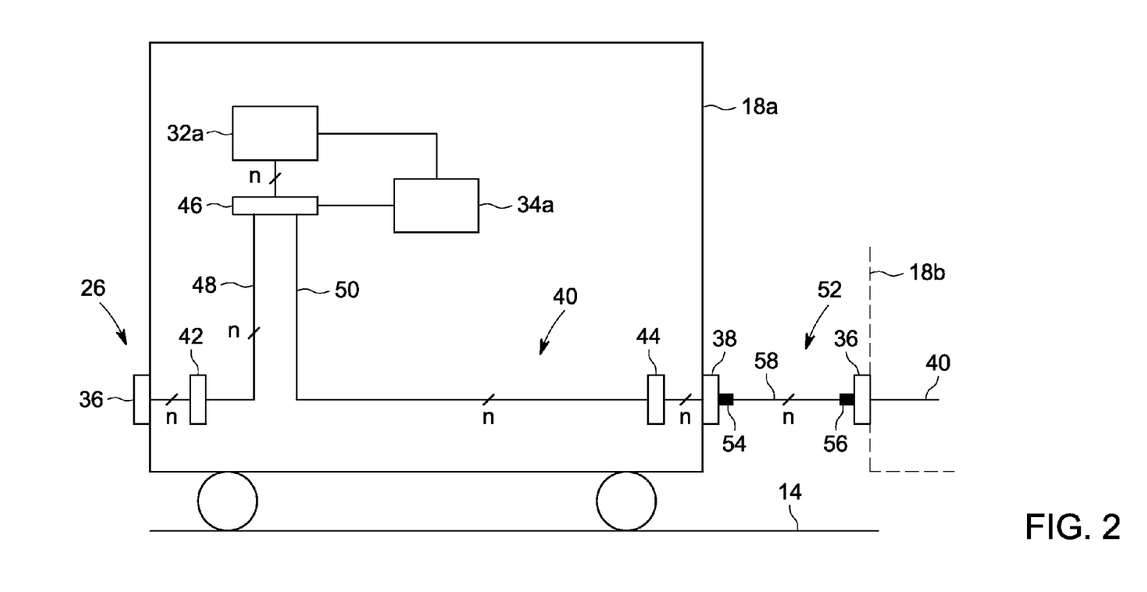
FIG. 2 is a schematic diagram of an MU cable bus in a locomotive, shown in the context of the communication system of FIG. 1.

One example of an MU cable bus 26 is shown in more detail in FIG. 2. Other configurations are possible, depending on the type of locomotive involved. As noted above, the MU cable bus 26 is an existing electrical bus interconnecting the lead locomotive 18a and the trail locomotives 18b, 18c in the consist. In each locomotive, e.g., the lead locomotive 18a as shown in FIG. 2, the MU cable bus 26 comprises a front MU port 36, a rear MU port 38, and an internal MU electrical system 40 that connects the front port 36 and the rear port 38 to one or more electronic components 32a of the locomotive 18a. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32a of the locomotive 18a may be electrically connected to the central terminal board 46, and thereby to the MU cable bus 26 generally. Although the front MU port 36 and rear MU port 38 may be located generally at the front and rear of the locomotive 18a, this is not always the case, and designations such as "front," "rear," "central," etc. are not meant to be limiting but are instead provided for identification purposes.

Figure 3:
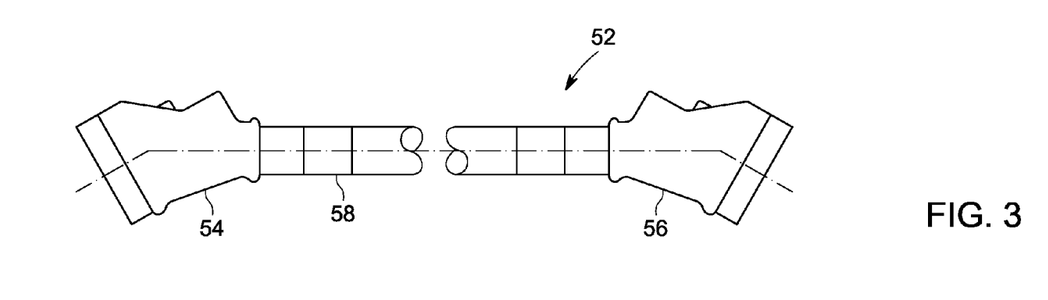
FIGS. 3 and 7 are schematic diagram of MU cable jumpers.

As shown in FIGS. 2 and 3, the MU cable bus 26 further comprises an MU cable jumper 52. The jumper 52 comprises first and second plug ends 54, 56 and a flexible cable portion 58 electrically and mechanically connecting the plug ends together. The plug ends 54, 56 fit into the MU ports 36, 38. The MU cable jumper 52 may be electrically symmetrical, meaning either plug end can be attached to either port. The MU cable jumper 52 is used to electrically interconnect the internal MU electrical systems 40 of adjacent locomotives 18a, 18b. As such, for each adjacent pair of locomotives 18a, 18b, one plug end 54 of an MU cable jumper 52 is attached to the rear MU port 28 of the front locomotive 18a, and the other plug end 56 of the MU cable jumper 52 is attached to the front MU port 36 of the rear locomotive 18b. The flexible cable portion 58 of the MU cable jumper 52 extends between the two plug ends, providing a flexible but secure electrical connection between the two locomotives 18a, 18b.

Depending on the particular type and configuration of locomotive, the electrical conduit portions 48, 50 and MU cable jumpers 52 may be configured in different manners, in terms of the number "n" ("n" is a real whole number equal to or greater than 1) and type of discreet electrical pathways included in the conduit or jumper. In one example, each conduit portion 48, 50 and the jumper cable portion 58 comprises a plurality of discreet electrical wires, such as 12-14 gauge copper wires. In another example, the cable portion 58 (of the MU cable jumper 52) comprises a plurality of discreet electrical wires, while the conduit portions 48, 50 each include one or more discreet electrical wires and/or non-wire electrical pathways, such as conductive structural components of the locomotive, pathways through or including electrical or electronic components, circuit board traces, or the like. Although certain elements in FIG. 2 are shown as including "n" discreet electrical pathways, it should be appreciated that the number of discreet pathways in each element may be different, i.e., "n" may be the same or different for each element.

As noted, the plug ends 54, 56 of the MU cable jumper 52 fit into the MU ports 36, 38. For this purpose, the plug ends and MU ports are complementary in shape to one another, both for mechanical and electrical attachment. The plug end 54, 56 may include a plurality of electrical pins, each of which fits into a corresponding electrical socket in an MU port. The number of pins and sockets may depend on the number of discreet electrical pathways extant in the internal electrical conduits 40, MU cable jumpers 52, etc. In one example, each plug end 54, 56 is a twenty seven-pin plug.

The central terminal board 46, front terminal board 42, and rear terminal board 44 each comprise an insulating base (attached to the locomotive) on which terminals for wires or cables have been mounted. This provides flexibility in terms of connecting different electronic components to the MU cable bus.

The MU cable bus 26 is used in the locomotive consist 12 for transferring non-network control information 28 between locomotives 18a, 18b, 18c in the consist. "Non-network" control information 28 refers to data or other information, used in the locomotive consist for control purposes, which is not packet data. In another example, non-network control information 28 is not packet data, and does not include recipient network addresses. The non-network control information 28 is transmitted over the MU cable bus 26 according to a designated voltage carrier signal (e.g., a 74 volt on/off signal, wherein 0V represents a digital "0" value and +74 volts a digital "1" value, or an analog signal of 0V-74V, wherein the 0-74V voltage level may represent a specific level or percentage of functionality). The non-network control information is transmitted and received using one or more electronic components 32a-32c in each locomotive that are configured for this purpose.

The term "MU cable bus" refers to the entire MU cable bus or any portion(s) thereof, e.g., terminal boards, ports, jumper cable, conduit portions, and the like. As should be appreciated, when two locomotives are connected via an MU cable jumper 52, both the MU cable jumper 52 and the internal MU electrical systems 40 of the two locomotives together form the MU cable bus. As subsequent locomotives are attached using additional MU cable jumpers 52, those cable jumpers and the internal MU electrical systems 40 of the subsequent locomotives also become part of the MU cable bus.

As indicated in FIG. 1, the locomotive consist 12 may be part of a train 60 that includes the locomotive consist 12, a plurality of railcars 62, and possibly additional locomotives or locomotive consists (not shown). Each locomotive 18a-18c in the consist 12 is mechanically coupled to at least one other, adjacent locomotive in the consist 12, through a coupler 64. The railcars 62 are similarly mechanically coupled together and to the locomotive consist to form a series of linked vehicles. The non-network control information may be used for locomotive control purposes or for other control purposes in the train 60.

As discussed above, the communication system 10 may comprise respective router transceiver units 34a, 34b, 34c positioned in the lead locomotive 18a and each of the trail locomotives 18b, 18c in the locomotive consist 12. The router transceiver units 34a, 34b, 34c are each electrically coupled to the MU cable bus 26. The router transceiver units 34a, 34b, 34c are configured to transmit and/or receive network data 16 over the MU cable bus 26. In one embodiment, each router transceiver unit receives network data 16 from a computer unit or other electronic component 32a, 32b, 32c in the locomotive consist 12, and modulates the received network data 16 into modulated network data 30 for transmission over the MU cable bus 26. Similarly, each router transceiver unit 34a, 34b, 34c receives modulated network data 30 over the MU cable bus 26 and de-modulates the received modulated network data 30 into network data 16. "Modulated" means converted from one form to a second, different form suitable for transmission over the MU cable bus 26. "De-modulated" means converted from the second form back into the first form. The modulated network data 30 is orthogonal to the non-network control information 28 transferred between locomotives over the MU cable bus 26. "Orthogonal" means that the modulated network data does not interfere with the non-network control information, and that the non-network control information does not interfere with the modulated network data (at least not to the extent that would corrupt the data). At recipient/subsequent locomotives, the modulated network data 30 is received over the MU cable bus 26 and de-modulated back into the network data 16 for use by a locomotive electronic component 32a, 32b, 32c.

The network data 16 is data that is packaged in packet form, meaning a data packet that comprises a set of associated data bits 20. Each data packet 20 may include a data field 22 and a network address or other address 24 uniquely associated with a computer unit or other electronic component 32a-32c in the consist 12. The network data 16 may be TCP/IP-formatted or SIP-formatted data, however, the electronic components and/or router transceiver units may use other communications protocols for communicating network data. As should be appreciated, the MU cable bus 26, electronic component 32a-32c, and router transceiver units 34a-34c together form a local area network. In one embodiment, these components are configured to form an Ethernet network.

Figure 4:
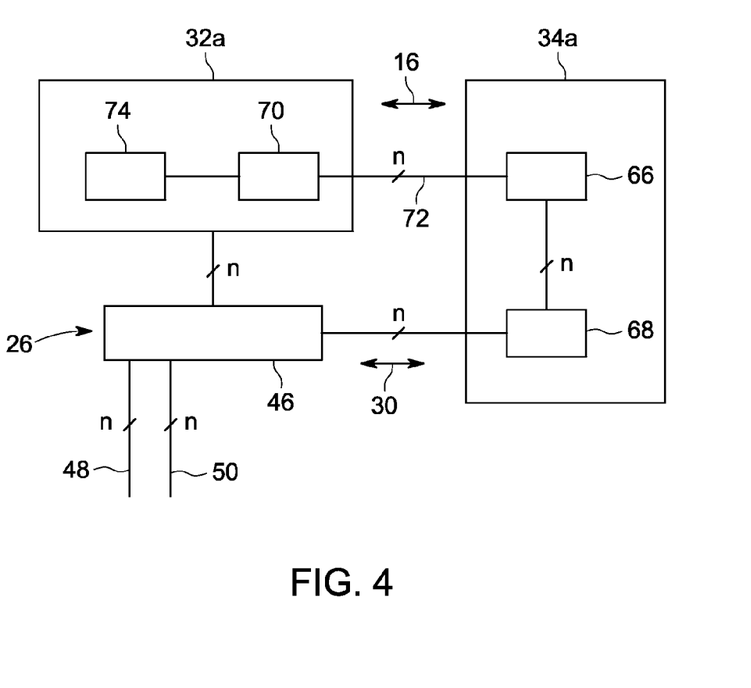
FIG. 4 is a schematic diagram of a router transceiver unit according to an embodiment of the present invention.

FIG. 4 shows one embodiment of a router transceiver unit 34a in more detail. The router transceiver unit 34a comprises a network adapter module 66 and a signal modulator module 68. The signal modulator module 68 is electrically connected to the network adapter module 66 and to the MU cable bus 26. In the example shown in FIG. 4, the signal modulator module 68 is electrically connected to the MU cable bus 26 by way of the central terminal board 46, near a locomotive electronic component 32a. The network adapter module 66 is electrically connected to a network interface unit 70 that is part of and/or operably connected to the electronic component 32a. (The electronic component 32a may be, for example, a computer unit for controlling a locomotive.) The network adapter module 66 and network interface unit 70 are electrically interconnected by a network cable 72. For example, if the network adapter module 66 and network interface unit 70 are configured as an Ethernet local area network, the network cable 72 may be a CAT-5E cable. The network interface unit 70 is functionally connected to one or more software or hardware applications 74 in the electronic component 32a that are configured for network communications. In one embodiment, the network interface unit 70, network cable 72, and software or hardware applications 74 include standard Ethernet-ready (or other network) components. For example, if the electronic component 32a is a computer unit, the network interface unit 70 may be an Ethernet adapter connected to computer unit for carrying out network communications.

The network adapter module 66 is configured to receive network data 16 from the network interface unit 70 over the network cable 72. The network adapter module 66 conveys the network data 16 to the signal modulator module 68, which modulates the network data 16 into modulated network data 30 and transmits the modulated network data 30 over the MU cable bus 26. The signal modulator module 68 also receives modulated network data 30 from over the MU cable bus 26 and de-modulates the modulated network data 30 into network data 16, which it then conveys to the network adapter module 66 for transmission to the network interface unit 70. One or both of the network adapter module 66 and the signal modulator module 68 may perform various processing steps on the network data 16 and/or the modulated network data 30 for transmission and reception both over the MU cable bus 26 and/or over the network cable 72 (to the network interface unit 70). Additionally, one both of the network adapter module 66 and the signal modulator module 68 may perform network data routing functions.

The signal modulator module 68 includes an electrical output (e.g., port, wires) for electrical connection to the MU cable bus 26, and internal circuitry (e.g., electrical and isolation components, microcontroller, software/firmware) for receiving network data 16 from the network adapter module 66, modulating the network data 16 into modulated network data 30, transmitting the modulated network data 30 over the MU cable bus 26, receiving modulated network data 30 over the MU cable bus 26, de-modulating the modulated network data 30 into network data 16, and communicating the network data 16 to the network adapter module 66. The internal circuitry may be configured to modulate and de-modulate data using schemes such as those utilized in VDSL or VHDSL (very high bitrate digital subscriber line) applications, or in power line digital subscriber line (PDSL) applications. One example of a suitable modulation scheme is orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation or communication scheme may involve applying a carrier wave (at a particular frequency orthogonal to frequencies used for non-network data in the MU cable bus) and modulating the carrier wave using digital signals corresponding to the network data 16.

Figure 5:
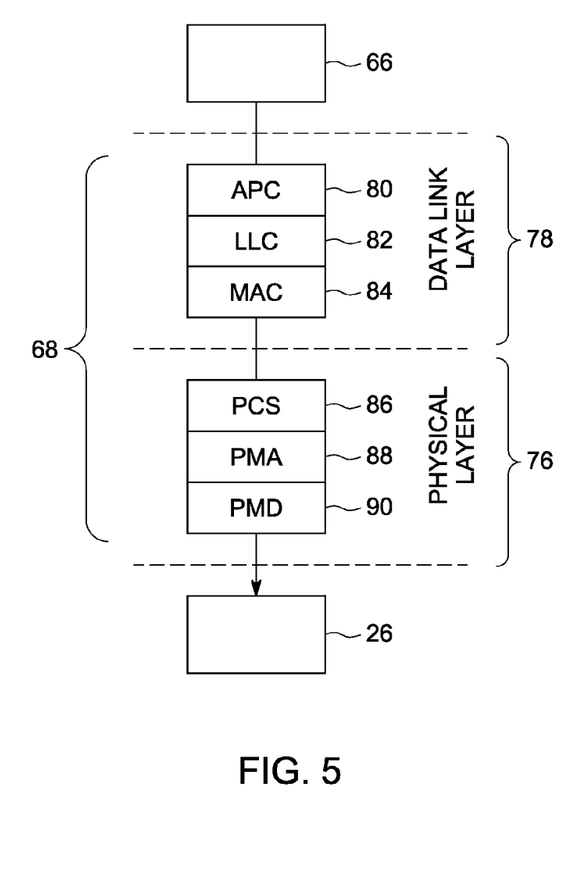
FIG. 5 is a schematic diagram illustrating the functionality of a signal modulator module portion of a router transceiver unit, according to an embodiment of the present invention.

FIG. 5 shows one possible example of how the signal modulator module 68 could function, cast in terms of the OSI network model, according to one embodiment of the present invention. In this example, the signal modulator module 68 includes a physical layer 76 and a data link layer 78. The data link layer 78 is divided into three sub-layers. The first sub-layer is an application protocol convergence (APC) layer 80. The APC layer accepts Ethernet (or other network) frames 16 from an upper application layer (e.g., the network adapter module 66) and encapsulates them into MAC (medium access control) service data units, which are transferred to a logical link control (LLC) layer 82. The LLC layer 82 is responsible for potential encryption, aggregation, segmentation, automatic repeat-request, and similar functions. The third sub-layer of the data link layer 78 is a MAC layer 84, which schedules channel access. The physical layer 76 is divided into three sub-layers. The first sub-layer is a physical coding sub-layer (PCS) 86, which is responsible for generating PHY (physical layer) headers. The second sub-layer is a physical medium attachment (PMA) layer 88, which is responsible for scrambling and FEC (forward error correction) coding/decoding. The third sub-layer is a physical medium dependent (PMD) layer 90, which is responsible for bit-loading and OFDM modulation. The PMD layer 90 is configured for interfacing with the MU cable bus 26, according to the particular configuration (electrical or otherwise) of the MU cable bus. The other sub-layers are medium independent, i.e., do not depend on the configuration of the MU cable bus.

Figure 6:
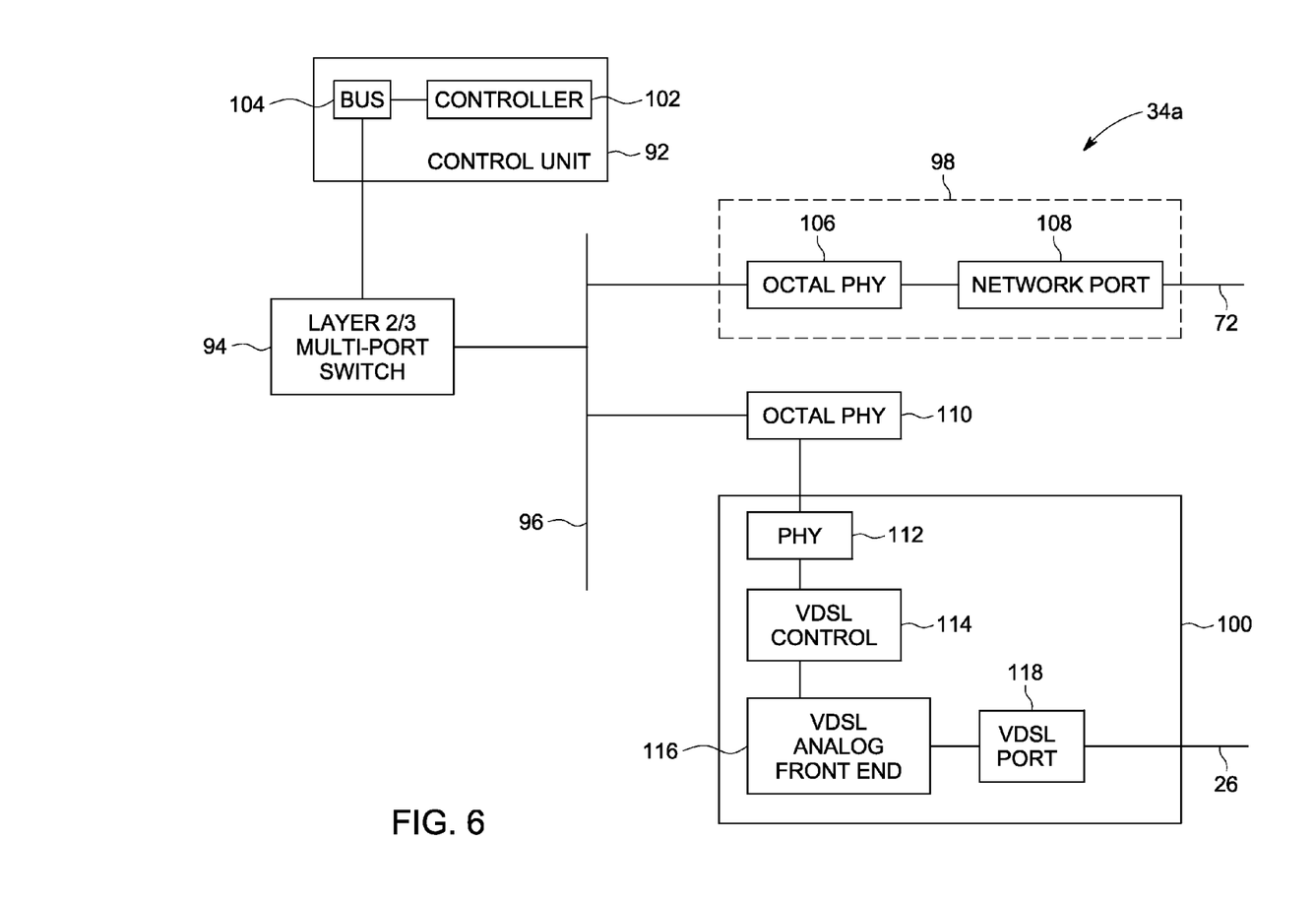
FIG. 6 is a circuit diagram of another embodiment of a router transceiver unit.

FIG. 6 is a circuit diagram of another embodiment of a router transceiver unit 34a. In this embodiment, the router transceiver unit 34a comprises a control unit 92, a switch 94, a main bus 96, a network interface portion 98, and a VDSL module 100. The control unit 92 comprises a controller 102 and a control unit bus 104. The controller 102 is electrically connected to the control unit bus 104 for communicating data over the bus 104. The controller 102 may be a microcontroller or other processor-based unit, including support circuitry for the microcontroller. The switch 94 is a network switching/router module configured to process and route packet data and other data. The switch 94 interfaces the control unit 92 with the main bus 96. The switch 94 may be, for example, a layer 2/3 multi-port switch. The network interface portion 98 is electrically connected to the main bus 96, and comprises an octal PHY (physical layer) portion 106 and a network port portion 108. The network port portion 108 is electrically connected to the octal PHY portion 106. The octal PHY portion 106 may comprise a 10/100/1000 Base T 8-port Ethernet (or other network) transceiver circuit. The network port portion 108 may comprise an Ethernet (or other network) transformer and associated CAT-5E receptacle (or other cable type receptacle) for receiving a network cable 72.

The VDSL module 100 is also connected to the main bus 96 by way of an octal PHY unit 110, which may be the same unit as the octal PHY portion 106 or a different octal PHY unit. The VDSL module 100 comprises a physical interface portion (PHY) 112 electrically connected to the octal PHY unit 110, a VDSL control 114 electrically connected to the physical interface portion 112, a VDSL analog front end unit 116 electrically connected to the VDSL control 114, and a VDSL port unit 118 electrically connected to the VDSL analog front end unit 116. The physical interface portion 112 acts as a physical and electrical interface with the octal PHY unit 110, e.g., the physical interface portion 112 may comprise a port and related support circuitry. The VDSL analog front end unit 116 is configured for transceiving modulated network data 30 (e.g., sending and receiving modulated data) over the MU cable bus 26, and may include one or more of the following: analog filters, line drivers, analog-to-digital and digital-to-analog converters, and related support circuitry (e.g., capacitors). The VDSL control 114 is configured for converting and/or processing network data 16 for modulation and de-modulation, and may include a microprocessor unit, ATM (asynchronous transfer mode) and IP (Internet Protocol) interfaces, and digital signal processing circuitry/functionality. The VDSL port unit 118 provides a physical and electrical connection to the MU cable bus 26, and may include transformer circuitry, circuit protection functionality, and a port or other attachment or connection mechanism for connecting the VDSL module 100 to the MU cable bus 26. Overall operation of the router transceiver unit 34a shown in FIG. 6 is similar to what is described in relation to FIGS. 1, 2, and 4.

Another embodiment of the invention relates to a method for communicating data in a locomotive consist 12. The method comprises transmitting network data 16, 30 between locomotives 18a-18c within a locomotive consist 12. (Each locomotive 18a-18c is adjacent to and mechanically coupled with one or more other locomotives in the consist.) The network data 16, 30 is transmitted over a locomotive multiple unit (MU) cable bus 26 interconnecting at least adjacent locomotives 18a, 18b in the consist 12. The MU cable bus 12 is an existing cable bus used in the locomotive consist 12 for transferring non-network control information 28 between locomotives 18a-18c in the consist 12.

In another embodiment, the method further comprises, at each of one or more of the locomotives 18a-18c in the locomotive consist 12, converting the network data 16 into modulated network data 30 for transmission over the MU cable bus 26. The modulated network data 30 is orthogonal to the non-network control information 28 transferred over the MU cable bus. The method further comprises de-modulating the modulated network data 30 received over the MU cable bus 26 for use by on-board electronic components 32a-32c of the locomotives.

As should be appreciated, it may be the case that certain locomotives in a consist are network equipped according to the system and method of the present invention, e.g., outfitted with a router transceiver unit, and that other locomotives in the consist are not. For example, there may be first and third network-equipped locomotives physically separated by a second locomotive that is not network equipped. In this case, the first and third locomotives are still able to communicate and exchange data even though there is a non-network equipped locomotive between them. This is possible because all the locomotives are still electrically connected via the MU cable bus. In one case, for example, a locomotive consist comprises first, second, and third locomotives, with the second locomotive being disposed between the first and third locomotives. A first router transceiver unit is positioned in the first locomotive, and a second router transceiver unit is positioned in the third locomotive. The second locomotive, however, does not have a router transceiver unit or other functionality for transmitting and/or receiving network data over the MU cable bus. Nevertheless, network data is transmitted between the first and third locomotives through the second locomotive, with the network data passing through a portion of the MU cable bus in the second locomotive but not being transmitted or received by the second locomotive.

In another embodiment, the method further comprises controlling at least one of the locomotives 18a-18c in the consist based at least in part on the network data 16.

The locomotive consist 12 may be part of a train 60 that comprises the locomotive consist 12 and a plurality of railcars 62. Here, the non-network control information 28 may be train control information that is transmitted over the MU cable bus according to a designated voltage carrier signal (e.g., +74V).

Figure 7:
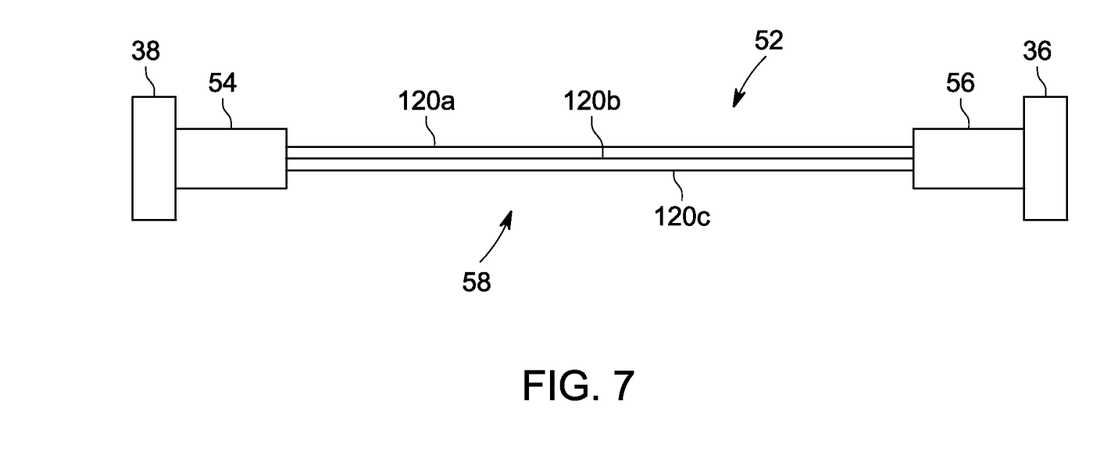

With reference to FIG. 7, if the MU cable jumper 52 and/or internal electrical system 40 includes plural discreet electrical wires or other electrical pathways, e.g., three discreet electrical wires 120a-120c as shown in FIG. 7, it may be the case that network data 30 is transmitted over only one of the plural discreet electrical wires or other electrical pathways. This may depend on what each pathway is used for in the locomotive consist and what type of information it carries. For example, it may be undesirable to transmit network data over a wire 120a that carries analog non-network data, whereas a wire 120b that carries a digital signal (on +V, off 0 V) is more desirable for transmitting network data.

Another embodiment of the present invention relates to a communication system 10 for communicating data in a locomotive consist 12. The system 10 comprises a respective router transceiver unit 34a-34c positioned in each locomotive 18a-18c of a locomotive consist 12. Each router transceiver unit 34a-34c is coupled to a locomotive multiple unit (MU) cable bus 26 in the locomotive consist 12 that interconnects adjacent locomotives 18a, 18b. The MU cable bus 16 is an existing cable bus used in the locomotive consist for transferring non-network control information 28 between locomotives within the locomotive consist. Each router transceiver unit 34a-34c is configured to transmit and/or receive network data 16, 30 over the MU cable bus 26.

In another embodiment of the system 10, each router transceiver unit 34a-34c is configured to convert the network data 16 into modulated network data 30 for transmission over the MU cable bus 26. The modulated network data being orthogonal to the non-network control information transferred between locomotives over the MU cable bus. Each router transceiver unit is further configured to de-modulate the modulated network data received over the MU cable bus for use by electronic components in the locomotives of the consist.

Another embodiment relates to a communication system for communicating data in a locomotive consist 12. In this embodiment, the system comprise a respective router transceiver unit 34a-34c positioned in each of a plurality of locomotives 18a-18c in the consist 12. The system further comprises, in each of the plurality of locomotives, a respective electronic component 32a-32c (e.g., computer unit) positioned in the locomotive and operably coupled to the router transceiver unit in the locomotive. The router transceiver units 34a-34c are electrically coupled to a locomotive multiple unit (MU) cable bus 26, which is an existing cable bus used in the consist for transferring non-network control information 28 between the plurality of locomotives. The router transceiver units 34a-34c are configured to transmit and/or receive network data 16, 30 over the MU cable bus 16, the network data originating at one of electronic components 32a-32c and being addressed to another of the electronic components 32a-32c. Each router transceiver unit may be configured to convert the network data into modulated network data for transmission over the MU cable bus (the modulated network data being orthogonal to the non-network control information transferred between locomotives over the MU cable bus), and to de-modulate the modulated network data received over the MU cable bus for use in one of the electronic components.

Another embodiment relates to a communication system for communicating data in a locomotive consist 12. The system comprises a computer network in the consist. The computer network comprises a respective electronic component 32a-32c positioned in each of a plurality of locomotives 18a-18c in the consist 12 and a locomotive multiple unit (MU) cable bus 26. The MU cable bus 26 interconnects the electronics components and is an existing cable bus used in the consist for transferring non-network control information 28 between the locomotives. The electronic components are configured to communicate by transmitting network data 16, 30 over the MU cable bus 26, the network data 16 originating at one of the electronic components and being addressed to another of the electronic components. As should be appreciated, in this embodiment the electronic components are configured to carry out the functionality of the router transceiver units 34a-34c as described above, and/or the router transceiver units 34a-34c are part of (or comprise) the electronic components. The computer network may be an Ethernet network.

Another embodiment relates to a method for retrofitting a locomotive for network data communications. The method comprises outfitting a locomotive with a router transceiver unit, interfacing the router transceiver unit with an electronic component of the locomotive, and interfacing the router transceiver unit with a multiple unit (MU) cable bus of the locomotive. The MU cable bus is an existing cable bus used for transferring non-network control information between locomotives in a consist. The router transceiver unit is configured to transmit and/or receive network data over the MU cable bus.

Another embodiment relates to a method for retrofitting a locomotive consist for network data communications. The method comprises, at each of a plurality of locomotives 18a-18c in a consist 12, outfitting the locomotive with a respective router transceiver unit 34a-34c, interfacing the router transceiver unit 34a-34c with an electronic component 32a-32c of the locomotive, and interfacing the router transceiver unit 34a-34c with a multiple unit (MU) cable bus 26 of the locomotive. The MU cable bus is an existing cable bus used for transferring non-network control information between locomotives in the consist. Each router transceiver unit is configured to transmit and/or receive network data 16, 30 over the MU cable bus 26.

Any of the embodiments described herein are also applicable for communicating data in vehicle consists generally. "Vehicle consist" refers to a group of vehicles that are mechanically coupled or linked together to travel along a route.

For example, one embodiment of the present invention relates to a system and method for communicating data in a vehicle consist 12. In this embodiment, network data 16, 30 is transmitted from a first vehicle 18a in the vehicle consist 12 to a second vehicle 18b in the vehicle consist. The network data 16, 30 is transmitted over an existing electrical cable bus 26 that interconnects the first vehicle 18a and the second vehicle 18b. The existing electrical cable bus 26 is used in the vehicle consist 12 for transferring non-network control information 28 between the first vehicle and the second vehicle. As should be appreciated, this method and system is applicable to communicating data between any of the linked vehicles 18a-18c, and thereby the terms "first" and "second" vehicle are used to identify respective vehicles in the vehicle consist and are not meant to characterize an order or position of the vehicles unless otherwise specified. That being said, it may be the case that the first and second vehicles are adjacent to and mechanically coupled with one another.

In any of the embodiments set forth herein, the network data may be TCP/IP-formatted or SIP-formatted data. Additionally, each vehicle may include a computer unit, with the computer units 32a-32c communicating with one another by transmitting the network data, formatted as TCP/IP data or SIP data or otherwise, over the existing electrical cable bus 26, and the computer units thereby forming a computer network, e.g., an Ethernet-type network.

In any of the embodiments set forth herein, the data transmitted over the MU cable bus or other existing electrical cable bus may additionally or alternatively be "high bandwidth" data, meaning data transmitted at average rates of 10 Mbit/sec or greater. (In one aspect, the data is high bandwidth data. In another aspect, the data is network data. In another aspect, the data is both high bandwidth data and network data, referred to herein as "high bandwidth network data," meaning data that is packaged in packet form as data packets and transmitted over the MU cable bus at average rates of 10 Mbit/sec or greater.) This reflects that the communication system (and associated method) are applicable for realizing a high information density communication environment in a locomotive consist, i.e., it is possible to exchange relatively large amounts of data between locomotives in a timely manner. In contrast, "low bandwidth" data is data transmitted at average rages of less than 10 Mbit/sec, and "very low bandwidth" data (a type of low bandwidth data) is data transmitted at average rates of 1200 bits/sec or less.

In any of the embodiments described herein, the existing electrical cable bus 26 may be an ECP (electronically controlled pneumatic brake) train line. ECP brakes on a train are defined by the Association of American Railroads' 4200 series specifications. This standard describes a 230V DC power line that runs the length of the train (for providing DC power to remote units), a transceiver at 132 kHz that operates on top of the 230V power line, and a communication link (realized over the power line using the transceiver) that adheres to the ANSI/EIA 709.1 and 709.2 protocols. According to the 4200 series specifications, the communication link is used to communicate brake data between railcars for braking control purposes.

Figure 8:
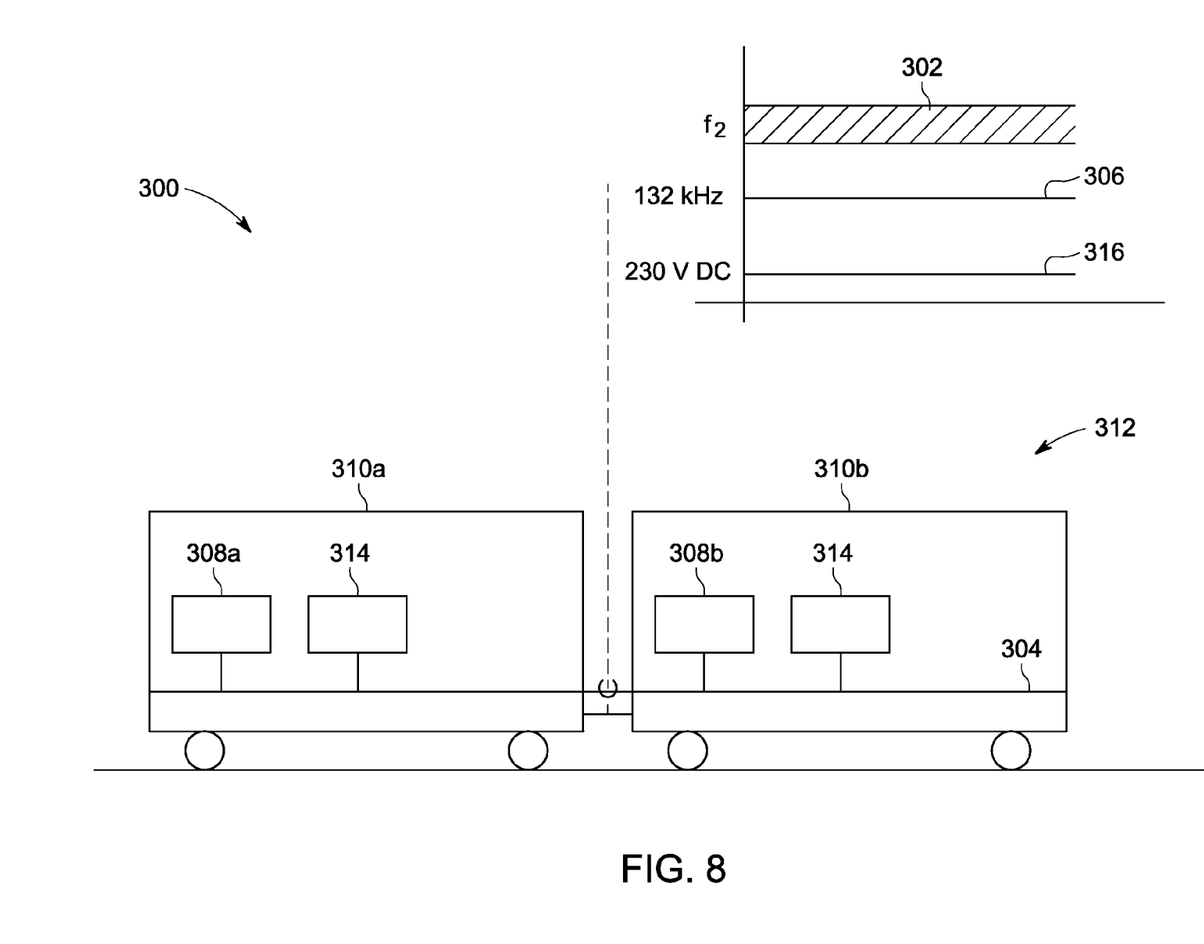
FIG. 8 is a schematic diagram of an embodiment of the communication system implemented in conjunction with an ECP train line.

In an embodiment, with reference to FIG. 8, a system 300 for communicating data in a locomotive consist or other vehicle consist is configured to transmit network and/or high bandwidth data 302 over an ECP train line 304, in a manner orthogonal to ECP brake data 306 transmitted over the ECP train line 304. The system 300 comprises a router transceiver unit 308a, 308b on each of a plurality of vehicles 310a, 310b in a consist 312. (The plurality of so-equipped vehicles may be fewer than all the vehicles in the consist.) On each vehicle, the router transceiver unit 308a, 308b is in addition to an ECP transceiver 314 on the vehicle. Alternatively, an ECP transceiver may be reconfigured to include the functionality of the router transceivers 308a, 308b. Each router transceiver unit 308a, 308b is electrically connected to the ECP train line 304, and is configured to transmit network and/or high bandwidth data 302 over the ECP train line 304 at one or more frequencies $f_2$ (i) that are different than the 132 kHz frequency of the ECP brake data 306, (ii) that do not interfere with (or receive significant interference from) the ECP brake data 306, and (iii) that do not interfere with (or receive significant interference from) the 230V DC signal 316 present on the ECP train line 304. (That is, the data 302 is orthogonal to the data 306 and DC signal 316.) For example, the network and/or high bandwidth data may be modulated into a carrier wave/RF signal transmitted over the ECP train line at a frequency in the megahertz (MHz) range. The router transceiver units 308a, 308b may be similar to the router transceiver units 34 described above. The embodiment of FIG. 8 may be implemented in conjunction with any of the other embodiments described herein. Also, in the case where certain vehicles in a consist are not equipped with router transceivers 308a, 308b, the data 302 will nevertheless be transmitted over the ECP train line extending through such vehicles, for eventual reception by vehicles that are equipped with the router transceivers 308a, 308b.

As should be appreciated, the system 300 establishes a high bandwidth data network that operates superimposed on, and separate from, the 132 kHz communication link that is specified in the 4200 series specifications for ECP brake traffic between the locomotive and the rail cars. In one aspect, the data network is used to communicate non-brake data (e.g., in the form of network and/or high bandwidth data) between vehicles in a consist. Examples of the data that may be transferred include vehicle sensor data indicative of vehicle health, commodity condition data, temperature data, weight data, security data, data as otherwise specified herein, and/or other data. In another aspect, the data network is used to communicate brake data in addition, or instead of, the 132 kHz communication link. The brake data may be in addition to other data transmitted over the data network.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for communicating data in a vehicle consist, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for communicating data in a locomotive consist, the method comprising:
   receiving network data from a first electronic component in a first locomotive of a locomotive consist, wherein the first locomotive is adjacent to and mechanically coupled with a second locomotive in the consist, and wherein a locomotive multiple unit (MU) cable bus interconnects at least the first and second locomotives in the consist, the MU cable bus being an existing cable bus used in the locomotive consist for transferring non-network control information between locomotives in the consist;
   converting the network data, having a form unsuitable for transmission over the MU cable bus, into modulated network data in a form suitable for transmission over the MU cable bus; and
   transmitting the modulated network data over the MU cable bus to the second locomotive, wherein the network data is high bandwidth network data that is TCP/IP-formatted or SIP-formatted, and wherein the network data comprises data packets with a network address uniquely associated with a second electronic component in the second locomotive.

2. The method of claim 1,
   wherein the modulated network data is orthogonal to the non-network control information transferred over the MU cable bus; and
   wherein the method further comprises de-modulating the modulated network data received over the MU cable bus for use by the second electronic component of the second locomotive.

3. The method of claim 2 further comprising controlling at least one of the locomotives in the consist based at least in part on the network data.

4. The method of claim 2 wherein:
   the locomotive consist is part of a train comprising the locomotive consist and a plurality of railcars; and
   the non-network control information comprises train control information that is transmitted over the MU cable bus according to a designated voltage carrier signal.

5. A communication system for communicating data in a locomotive consist, the system comprising:
   a respective router transceiver unit positioned in each of at least two locomotives of a locomotive consist, wherein each locomotive within the locomotive consist is adjacent to and mechanically coupled with one or more other locomotives in the consist;
   wherein each router transceiver unit is coupled to a locomotive multiple unit (MU) cable bus in the locomotive consist that interconnects adjacent locomotives, the MU cable bus being an existing cable bus used in the locomotive consist for transferring non-network control information between locomotives within the locomotive consist; and
   wherein each router transceiver unit is configured to convert network data, having a form unsuitable for transmission over the MU cable bus, into modulated network data in a form suitable for transmission over the MU cable bus, and to de-modulate the modulated network data received over the MU cable bus for use by electronic components in the locomotives of the locomotive consist, and wherein the network data is high bandwidth network data that is TCP/IP-formatted or SIP-formatted, the network data comprising data packets with network addresses uniquely associated with the electronic components.

6. The system of claim 5 wherein the modulated network data is orthogonal to the non-network control information transferred between locomotives over the MU cable bus.

7. The system of claim 6 wherein:
the locomotive consist is part of a train comprising the locomotive consist and a plurality of railcars; and
the non-network control information comprises train control information that is transmitted over the MU cable bus according to a designated voltage carrier signal.

8. The system of claim 5 wherein:
the locomotive consist comprises first, second, and third locomotives, the second locomotive being disposed between the first locomotive and the third locomotive;
first and second router transceiver units are positioned in the first and third locomotives, respectively;
the second locomotive does not have a router transceiver unit or other functionality for transmitting and/or receiving modulated network data over the MU cable bus; and
the modulated network data is transmitted between the first and third locomotives through the second locomotive, the modulated network data passing through a portion of the MU cable bus located in the second locomotive but not being transmitted or received by the second locomotive.

9. A communication system for communicating data in a locomotive consist, the system comprising:
a respective router transceiver unit positioned in each of at least two of a plurality of locomotives in the consist; and
in each of the at least two of the plurality of locomotives, a respective electronic component positioned in the locomotive and operably coupled to the router transceiver unit in the locomotive;
wherein the router transceiver units are electrically coupled to a locomotive multiple unit (MU) cable bus, the MU cable bus being an existing cable bus used in the consist for transferring non-network control information between the plurality of locomotives; and
wherein the router transceiver units are configured to convert network data, having a form unsuitable for transmission over the MU cable bus, into modulated network data in a form suitable for transmission over the MU cable bus, the network data originating at one of electronic components and being uniquely addressed to another of the electronic components, and wherein the network data is high bandwidth network data that is TCP/IP-formatted or SIP-formatted.

10. The system of claim 9 wherein the modulated network data is orthogonal to the non-network control information transferred between locomotives over the MU cable bus.

11. A communication system for communicating data in a locomotive consist, the system comprising:
an Ethernet network in the consist, the Ethernet network comprising a respective electronic component positioned in each of at least two of a plurality of locomotives in the consist and a locomotive multiple unit (MU) cable bus, the MU cable bus interconnecting the electronic components and being an existing cable bus used in the consist for transferring non-network control information between the locomotives;
wherein the electronic components are configured to communicate by converting network data of the Ethernet network, having a form unsuitable for transmission over the MU cable bus, into modulated network data in a form suitable for transmission over the MU cable bus, the network data comprising high bandwidth network data originating at one of the electronic components and being uniquely addressed to another of the electronic components.

12. A method for communicating data in a vehicle consist, the method comprising:
in a first vehicle of the vehicle consist, converting network data into modulated network data suitable for transmission over an existing electrical cable bus interconnecting the first vehicle and at least a second vehicle in the vehicle consist, wherein the network data comprises high bandwidth network data; and
transmitting the modulated network data, comprising the high bandwidth network data, from the first vehicle to the second vehicle
over an over the existing electrical cable bus interconnecting the first vehicle and the second vehicle, the existing electrical cable bus being used in the vehicle consist for transferring non-network and/or low bandwidth control information between the first vehicle and the second vehicle;
wherein the modulated network data is orthogonal to the non-network control information transferred between the first and second vehicles over the existing electrical cable bus;
wherein the method further comprises, at the second vehicle, de-modulating the modulated network data received over the existing electrical cable bus into the high bandwidth network data for use by a computer unit in the second vehicle;
wherein the vehicle consist is a train, the first vehicle is a first locomotive, and the second vehicle is a second locomotive;
the existing electrical cable bus is a locomotive multiple unit (MU) cable bus interconnecting the first locomotive and the second locomotive; and
the non-network control information comprises train control information that is transmitted over the MU cable bus according to a designated voltage carrier signal.

13. The method of claim 12 wherein the existing electrical cable bus is an ECP train line.

14. A router transceiver unit comprising:
a network adapter module configured for electrical connection to a network interface unit, wherein the network adapter module is configured to receive high bandwidth network data from the network interface unit; and
a signal modulator module electrically connected to the network adapter module, the signal modulator module comprising an electrical output and internal circuitry, wherein the electrical output is configured for electrical connection to a locomotive multiple unit (MU) cable bus, and wherein the internal circuitry is configured to receive the high bandwidth network data from the network adapter module, to convert the high bandwidth network data into modulated network data in a form suitable for transmission over the MU cable bus, and to transmit the modulated network data, comprising the high bandwidth network data, over the MU cable bus.

15. The router transceiver unit of claim 14, wherein the high bandwidth network data is TCP/IP-formatted or SIP-formatted and comprises data packets with network addresses uniquely associated with recipient electronic devices.

* * * * *

UNITED STATES PATENT AND TRADEMARK OFFICE
CERTIFICATE OF CORRECTION

| | |
|---|---|
| PATENT NO. | : 8,532,850 B2 |
| APPLICATION NO. | : 12/683874 |
| DATED | : September 10, 2013 |
| INVENTOR(S) | : Cooper et al. |

It is certified that error appears in the above-identified patent and that said Letters Patent is hereby corrected as shown below:

In the Specification

In Column 9, Line 65, delete "MU cable bus 16" and insert -- MU cable bus 26 --, therefor.

In Column 10, Line 29, delete "MU cable bus 16," and insert -- MU cable bus 26, --, therefor.

In the Claims

In Column 16, Lines 18-23, in Claim 12, delete "over an over the existing electrical cable bus interconnecting the first vehicle and the second vehicle, the existing electrical cable bus being used in the vehicle consist for transferring non-network and/or low bandwidth control information between the first vehicle and the second vehicle;" and insert -- over the existing electrical cable bus interconnecting the first vehicle and the second vehicle, the existing electrical cable bus being used in the vehicle consist for transferring non-network and/or low bandwidth control information between the first vehicle and the second vehicle; --, at Line 17, after "second vehicle".

Signed and Sealed this
Fifth Day of November, 2013

Teresa Stanek Rea
*Deputy Director of the United States Patent and Trademark Office*